July 2, 1968  F. DUEPNER  3,391,278
INFRARED ENERGY RESPONSIVE DEVICE HAVING THERMOSENSITIVE
RESISTORS THERMALLY CONNECTED TO A PAIR
OF INFRARED ENERGY ABSORBERS
Filed Jan. 14, 1965  3 Sheets-Sheet 1

INVENTOR
FENTON DUEPNER

BY  Harry A. Herbert Jr
ATTORNEY

Richard J Killoren
AGENT

July 2, 1968  F. DUEPNER  3,391,278
INFRARED ENERGY RESPONSIVE DEVICE HAVING THERMOSENSITIVE
RESISTORS THERMALLY CONNECTED TO A PAIR
OF INFRARED ENERGY ABSORBERS
Filed Jan. 14, 1965  3 Sheets-Sheet 2
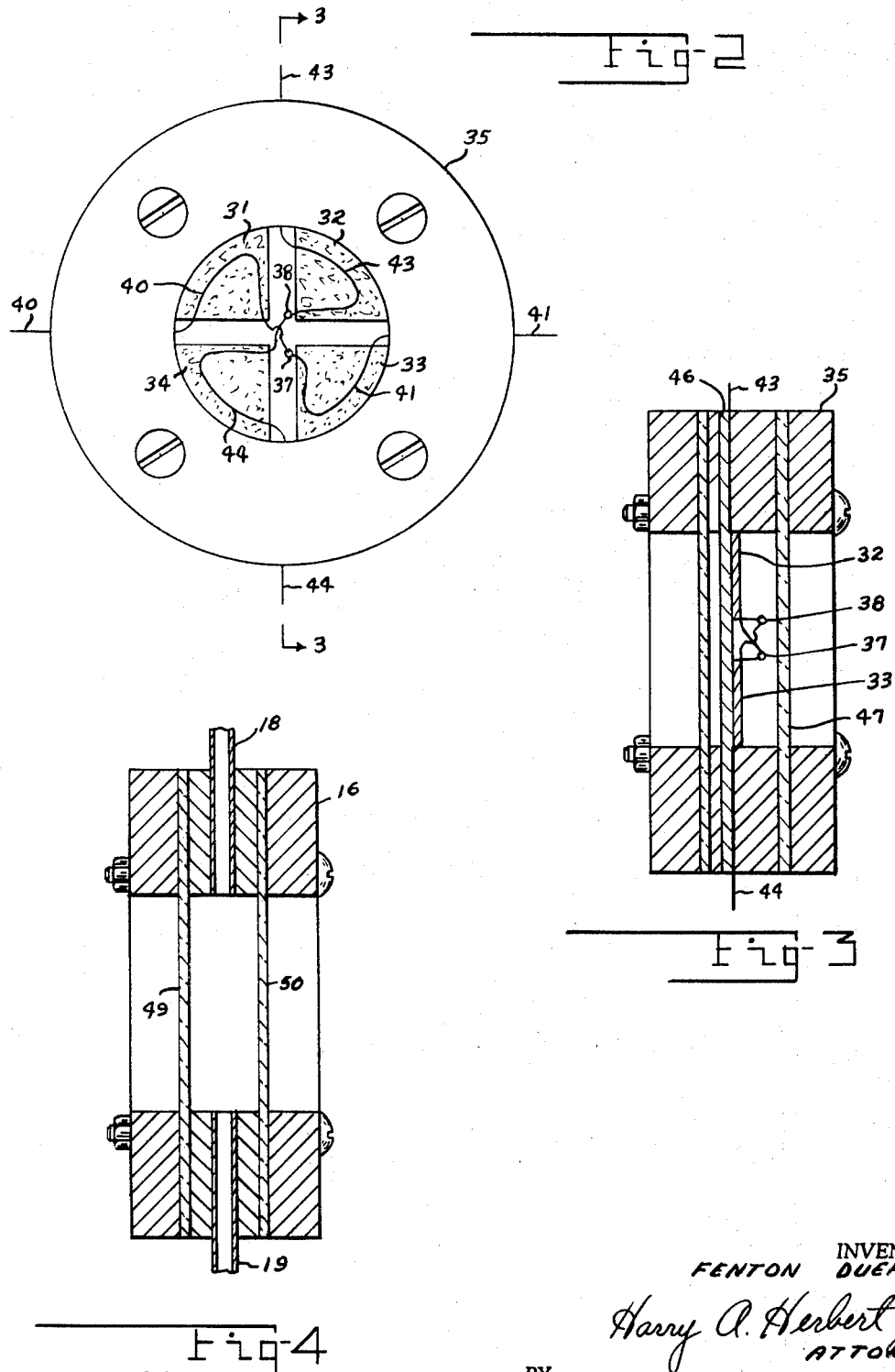
INVENTOR
FENTON DUEPNER
Harry A. Herbert Jr
ATTORNEY
BY
Richard J. Killian
AGENT

United States Patent Office 3,391,278
Patented July 2, 1968

3,391,278
INFRARED ENERGY RESPONSIVE DEVICE HAVING THERMOSENSITIVE RESISTORS THERMALLY CONNECTED TO A PAIR OF INFRARED ENERGY ABSORBERS
Fenton Duepner, 2200 W. Olmos Drive,
San Antonio, Tex. 78201
Filed Jan. 14, 1965, Ser. No. 425,638
1 Claim. (Cl. 250—83.3)

ABSTRACT OF THE DISCLOSURE

An infrared source is located between two bolometers with a test gas cell located between the infrared source and one of the bolometers and a filter gas cell located between the infrared source and the other of the bolometers. A sample of the gas to be tested is supplied to the test gas cell. The filter gas cell contains all of the gases which would be expected to be found in the test gas, except the gas for which the test is being made. Each bolometer has two thermosensitive resistor elements and four energy collector plates. The electrical leads for each of the resistor elements are secured to diagonally positioned plates so as to conduct heat to the resistor elements. The resistor elements are connected in a Wheatstone bridge circuit with the output of the bridge connected to an indicator through an amplifier and rectifier circuit.

---

The invention described herein may be manufactured and used by or for the United States Government for governmental purposes without the payment to me of any royalty thereon.

This invention relates to a method and apparatus for the determination of the partial pressure of a particular gas, such as carbon dioxide, in a continuous gas stream.

One object of the invention is to provide a system, for determining the partial pressure of a particular gas in a continuous gas stream, which requires no moving parts.

Another object of the invention is to provide a partial pressure-determining apparatus which is light in weight and less sensitive to shock, vibration and acceleration fields than prior art devices.

These and other objects will be more fully understood from the following detailed description taken with the drawing wherein:

FIG. 2 shows one type of bolometer which may be used with the device of FIG. 1;

FIG. 3 is a sectional view of the device of FIG. 2 along the line 3—3;

FIG. 4 shows one possible construction for the gas cells of the device of FIG. 1.

The use of carbon dioxide sensors in space probes makes it desirable to provide lightweight instruments which are substantially insensitive to shock, vibration, acceleration fields and ambient temperature changes.

The carbon dioxide sensor of this invention has no moving parts, which makes it substantially insensitive to shock, vibration and acceleration fields, and a Wheatstone bridge in the sensing circuit to provide substantially self-compensating characteristics for ambient temperature changes.

The instrument consists essentially of an infrared source and two bolometers with a filter gas cell located between the infrared source and one of the bolometers and a sample test gas cell between the infrared source and the other bolometer. The bolometers are connected in a Wheatstone bridge circuit with the output of the bridge being connected to an indicator through an amplifier and rectifier circuit.

Figure 1:
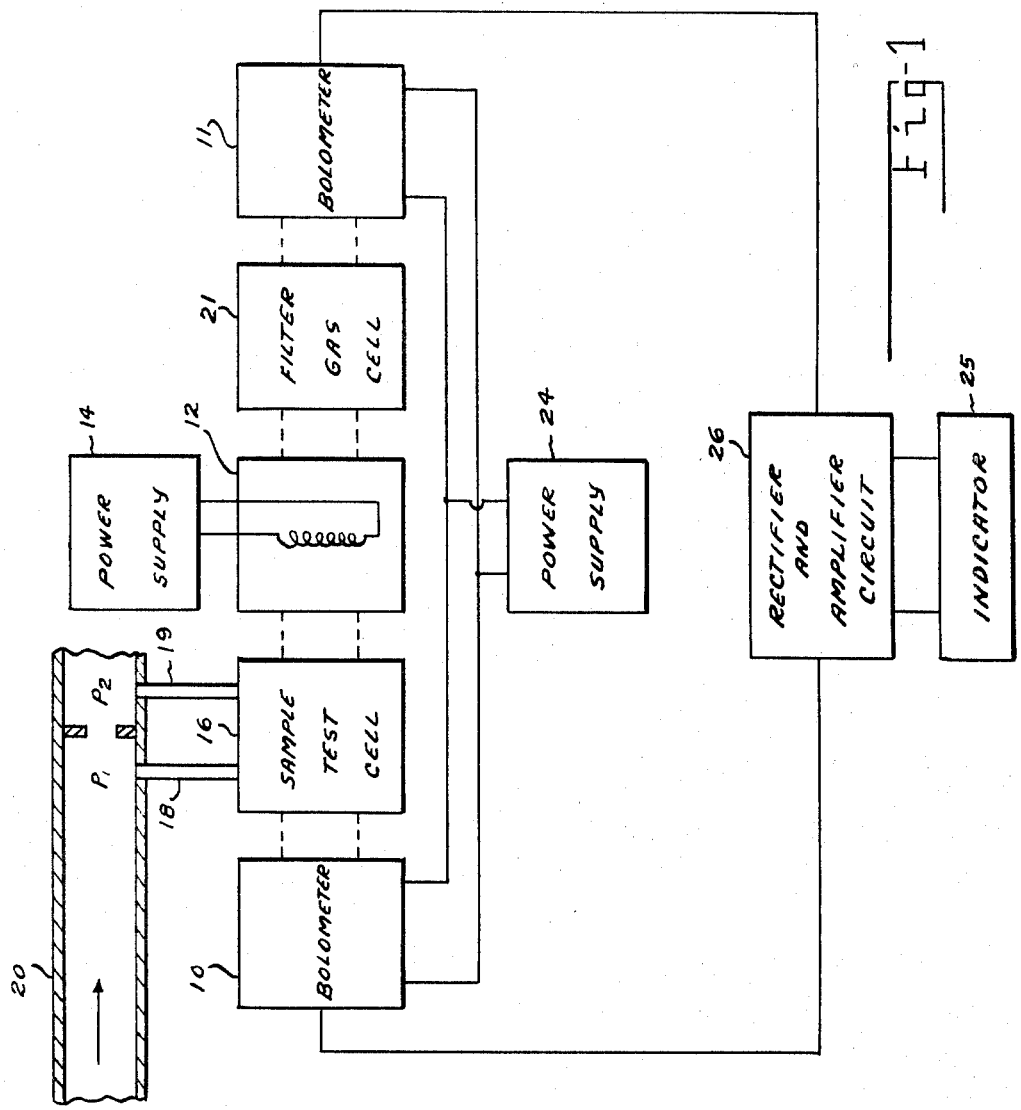
FIG. 1 is a block diagram of the partial pressure test system of the invention.

Reference is now made to FIG. 1 of the drawing which shows two bolometers 10 and 11 and an infrared source 12. The infrared source 12 is energized by a power supply 14. A sample test cell 16 is located between the infrared source 12 and the bolometer 10. The test gas is supplied to the sample test cell 16 through tubes 18 and 19. The tubes 18 and 19 are connected at points of different pressure $P_1$ and $P_2$, in the continuous stream for which the test is required. Any points of different pressure which may normally exist in the continuous stream, and will cause a flow of gas through the sample test cell 16, may be used. For illustration purposes a stream flowing past a restriction in a conduit 20 is shown.

A filter gas cell 21 is located between the infrared source 12 and the bolometer 11. The filter gas cell 21 contains all of the gases which would be expected to be found in the continuous gas stream, except the gas for which the test is desired. For example, in a test for carbon dioxide the filter cell would be filled with a quantity of gas cotnaining all of the gases which might be found in the continuous stream except carbon dioxide.

Power, from a low frequency source 24, is supplied to the bolometers 10 and 11. The output of the bolometers 10 and 11 is applied to an indicating device 25 through a rectifier and amplifier circuit 26 as is shown in greater detail in FIG. 5.

Figure 5:
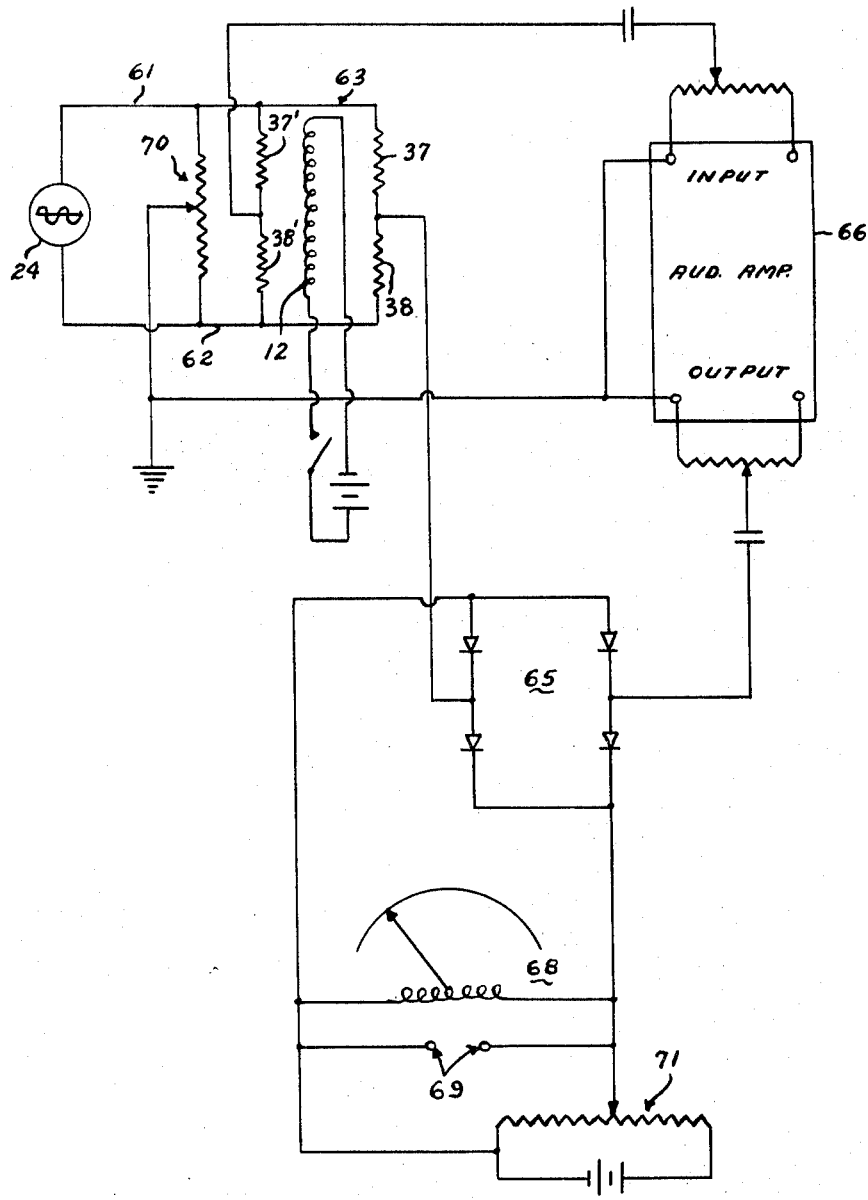
FIG. 5 is a circuit schematic of the sensing circuit for the device of FIG. 1.

As shown in FIG. 2 the bolometers consist of four energy collector plates 31, 32, 33 and 34 located within a chamber 35. The collector plates are anodized aluminum foil which are dyed black with an aniline dye. Two thermosensitive resistor beads 37 and 38 are also located within chamber 35. A pair of leads 40 and 41 are connected to thermosensitive resistor bead 37. The leads 40 and 41 are secured to plates 31 and 33 respectively, with an epoxy cement. A pair of leads 43 and 44 are connected to thermosensitive resistor bead 38. The leads 43 and 44 are secured to plates 32 and 34 respectively. The leads 40, 41 and 43, 44 conduct heat from the plates 31, 33 and 32, 34 to the thermosensitive beads 37 and 38 and also act to support the beads 37 and 38. The leads 40, 41, 43 and 44 extend through the wall of chamber 35 for connection in the circuit as shown in FIG. 5. The plates 31, 32, 33 and 34 are supported upon a plate 46 of insulation material. The plates 31, 32, 33 and 34 are symmetrically positioned around the center of plate 46, as shown in FIGS. 2 and 3 of the drawing. Since the maximum energy absorption for carbon dioxide is in the vicinity of 4.3 microns wave length, the window 47 must be selected for maximum infrared transparency in this region of the spectrum. Mica or aluminum oxide will serve the purpose and may be used for window 47.

The sample test cell 16 may be as shown in FIG. 4. The windows 49 and 50 are made of the same material as the window 47 of the bolometers. The filter cell 21 may have substantially the same construction as the sample test cell 16 except that it is sealed off after it is filled with the filter gases.

The bolometers are connected in a Wheatstone bridge circuit as shown in FIG. 5. A low-frequency signal (50–5000 c.p.s.) is applied across the terminals 61 and 62 of the bridge 63. The thermosensitive elements 37' and 38' for the filter cell are connected in series with the junction thereof connected to a rectifier circuit 65. The junction of the thermosensitive elements 37 and 38 for the sample test cell is connected to the rectifier circuit 65 through an amplifier circuit 66. The amplifier circuit 66 may be a transistor amplifier circuit. The output of rectifier circuit 65 is connected to a meter indicator shown schematically at 68. Terminals 69 are provided for connecting the output to a recorder if desired. A null adjustment may be obtained by the adjustment of resistor 70 and a zero adjustment may be obtained by the adjustment of potentiometer 71.

In the operation of the device of the invention, with the filter cell filled with proper filter gases and the tubes 18 and 19 connected to points of different pressure in the continuous stream for which the test is desired, the infrared source 12 is energized. The infrared energy passes through the sample test cell 16 and into bolometer 10. The infrared energy also passes through the filter cell 21 into bolometer 11. If there is no carbon dioxide in the gas in the continuous stream in conduit 20, there will be equal absorption of the gases in sample cell 16 and filter cell 21 and the indicator will register zero. If carbon dioxide is present in the gas stream in conduit 20, there will be a greater absorption of the infrared energy in the sample test cell 16 than in the filter cell 21. Thus, less energy will reach bolometer 10 than bolometer 11. This will cause an unbalance in the Wheatstone bridge and will provide a corresponding indication on the indicator 25.

While the continuous stream is illustrated as in a conduit 20, it is to be understood that the device could be used in any system where there is a difference in pressure available, such as at different points in the air circulation system of a space vehicle.

There is thus provided a method and apparatus for the determination of the partial pressure of a particular gas in a continuous gas stream.

While a certain embodiment has been described, it is understood that numerous changes may be made without departing from the general principle and scope of the invention.

I claim:
1. An infrared energy responsive device, comprising: a housing, an infrared transparent window in said housing; an insulating support within said housing; a plurality of pairs of infrared energy absorbing plate members attached to said insulating support in energy receiving relation to said window; said plates being symmetrically positioned around the center of said support; a plurality of thermosensitive resistor elements within said housing and spaced from said plate members; a pair of electrical lead means connected to each of said thermosensitive resistor elements and extending through the wall of said housing for supporting said thermosensitive resistor elements within said housing; each of said lead means being secured to one of said energy absorbing plate members with the leads from each resistor element being secured to diagonally positioned plates, whereby said lead means will transmit the heat from said plate members to said thermosensitive resistor elements.

References Cited
UNITED STATES PATENTS

| | | | |
|---|---|---|---|
| 1,691,138 | 11/1928 | Schmick | 250—43.5 |
| 2,399,640 | 5/1946 | Kettering | 250—83.3 |
| 3,116,413 | 12/1963 | Schaefer et al. | 250—43.5 |
| 3,118,062 | 1/1964 | Ilgenfritz et al. | 250—83.3 |

WILLIAM F. LINDQUIST, *Primary Examiner.*

RALPH G. NILSON, *Examiner.*